Nov. 17, 1970  J. P. BADGER ET AL  3,540,939

WATER-ACTIVABLE BATTERY CONSTRUCTION

Filed May 29, 1968  3 Sheets-Sheet 1

INVENTORS.
JOHN P. BADGER
HERBERT A. BERNHOLTZ
BY
D. Henry Stoltenberg
ATTORNEY

Nov. 17, 1970     J. P. BADGER ET AL     3,540,939
WATER-ACTIVABLE BATTERY CONSTRUCTION
Filed May 29, 1968                      3 Sheets-Sheet 3

INVENTORS.
JOHN P. BADGER
HERBERT A. BERNHOLTZ
BY
  D. Henry Stoltenberg
                ATTORNEY United States Patent Office 3,540,939
Patented Nov. 17, 1970

3,540,939
WATER-ACTIVABLE BATTERY CONSTRUCTION
John P. Badger, Genoa, and Herbert A. Bernholtz, Sylvania, Ohio, assignors to Eltra Corporation, Toledo, Ohio
Filed May 29, 1968, Ser. No. 733,135
Int. Cl. H01m 45/00
U.S. Cl. 136—162                                14 Claims

ABSTRACT OF THE DISCLOSURE

A container for immobilized concentrated battery acid in semi-solid or granular form for use in a water-activable battery. The container has a first hollow rectangular portion adapted to be vertically positioned within a battery cell between the plates and a cell sidewall. A second hollow section is generally at right angles to the first section so that it overlies and rests upon the plates beneath the filler opening in the battery cover. A filler tube extends upwardly from the upper surface of the second section below the battery vent cap. The first section includes a water-permeable area in the lowermost regions thereof so that liquid entering the second hollow section at the top of the container will flow through both portions of the container and into the battery cell through the water-permeable section. The container may include an overflow cup on the upper surface of the second section to facilitate rapid pouring of the liquid into the battery and can have a filler tube extending upwardly toward the filler opening of the battery.

An alternate construction includes a separate compartment for the acid gel which is formed as an integral part of the battery case.

This invention relates to an improvement in water-activable electric storage batteries of the type commonly used in automobiles. It has been recognized that new or replacement dry-charged batteries which can be quickly and conveniently brought to a fully active condition without the necessity of the installer having to handle the battery electrolyte, such as sulfuric acid, are desirable for general use and particularly for use in automotive applications.

One type of water-activable battery which eliminates direct handling of the electrolyte includes a frangible or soluble capsule of concentrated sulfuric acid positioned in the battery cells and a means of breaking the capsules or dissolving them when the battery is ready for activation. Batteries of this type, such as are disclosed in United States Patents 2,773,927, 2,832,814 and 3,304,202, suffer the disadvantages in that it is possible that a breakable capsule can be unintentionally broken during shipment, the constructions of the capsules are costly, and, in the case of batteries with frangible capsules, a tool is required to rupture the acid-containing capsules.

Another approach has been to inactivate or immobilize the concentrated sulfuric acid by combining it with a gel-forming or granular-forming agent such as finely-divided silicon dioxide and disposing the immobilized acid above, below or beside the battery plates so that when the battery is ready for activation, water added to the battery will release the acid in the desired form and concentration. This type of battery suffers from the disadvantage that an unacceptably long time is required for the battery to become active, after the addition of water, since the water must diffuse into, and the electrolyte must diffuse from, the mass of immobilized acid.

A number of materials are known in the prior art which are suitable for combining with sulfuric acid to form a water-activable gel or solidified material and are disclosed, for instance, in U.S. Patents 3,257,237 and 3,271,199, and British patent specification 913,474. It has been found that the invention of this application is particularly suitable for use with an immobilized acid which has been gelled by the inclusion of selected amounts of colloidal silicon dioxide, which is commercially available in a finely-divided powdered form under the trademark "Cab-O-Sil," from the Cabot Corporation, Boston, Mass.

When the finely-divided silicon dioxide is mixed with concentrated sulfuric acid, the resultant product may be either a viscous gel or a powder. "Cab-O-Sil" in the amount of six parts by weight to 100 parts by weight of concentrated sulfuric acid produces a stiff, but extrudable gel. If twelve parts of Cab-O-Sil is mixed with 100 parts of concentrated acid, a nearly solid, granular material results. The proportion of powdered silicon dioxide added to the sulfuric acid may be varied from about four parts per hundred parts of acid to about fourteen parts to give the resultant gel or granular material the desired physical characteristics for retention in the container to be placed within the battery cell.

It is an object of this invention to provide a container for the immobilized concentrated sulfuric acid, hereinafter referred to as the acid gel, which is placed within a dry charged battery at the point of manufacture and will retain the acid gel in a fixed position relative to the plates within the battery until such time as water is added to the battery at the point of installation to release the electrolyte from the gel. It is necessary to provide such a container because, upon the addition of water and release of the concentrated sulfuric acid, the remaining finely-divided silica, if allowed to freely circulate within the battery cell, will adhere to the surfaces of the plates and seriously affect their performance. Thus, the container of this invention is intended to retain the immobilized acid in its gelled or granular form, and to release the concentrated battery acid upon the addition of water, but yet substantially retain the finely-divided silicon dioxide.

It is a further object of the instant invention to provide a container for the acid gel which directs or channels the flow of water added to the battery through its filler opening such that it will make substantial surface contact with the acid gel in order to release the concentrated sulfuric acid prior to entering the battery cell. This is important because of the desirability of a relatively fast activation time which would not be possible if water were poured directly into the battery cell without being directed to flow across the acid gel.

Other objects and advantages of the instant invention will be apparent to those skilled in the art from the following detailed description of preferred embodiments thereof, reference being made to the drawings in which.

Figure 1:
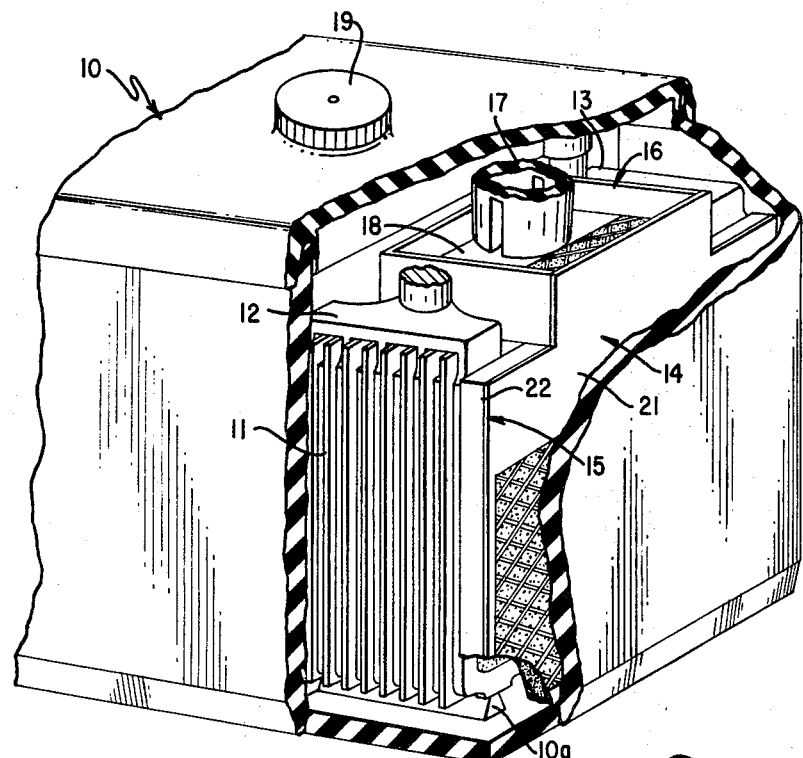
FIG. 1 is a view in perspective of a portion of a conventional electric storage battery, showing the interior construction of a single cell with the acid gel container of this invention positioned therein.

Referring briefly to FIG. 1, a conventional multiple cell dry charged storage battery 10 is shown with the cutaway section of a single cell illustrated to show the stack 11 of interleaved positive and negative plates. A positive and negative connecting strap 12 and 13 is connected to the respective positive and negative plates on each side of the plate stack 11, and the plates themselves rest upon at least one upwardly-extending rib 10a which is molded on the bottom of the battery case. The acid gel container of this invention, generally designated by reference numeral 14, is dimensioned such that its first or vertical portion 15 will fit between the plate stack 11 and the wall of the battery cell, and such that its second or horizontal portion 16 will overlie the plate stack 11 between the positive and negative connecting straps 12 and 13. A circular flange or filling tube 17 extends from the battery cover around the filler opening downwardly toward the upper surface 18 of the horizontal portion, as shown in FIG. 1. This filling tube 17 is covered by the filler cap 19, as shown on the adjacent cell in FIG. 1.

Figures 3, 4:
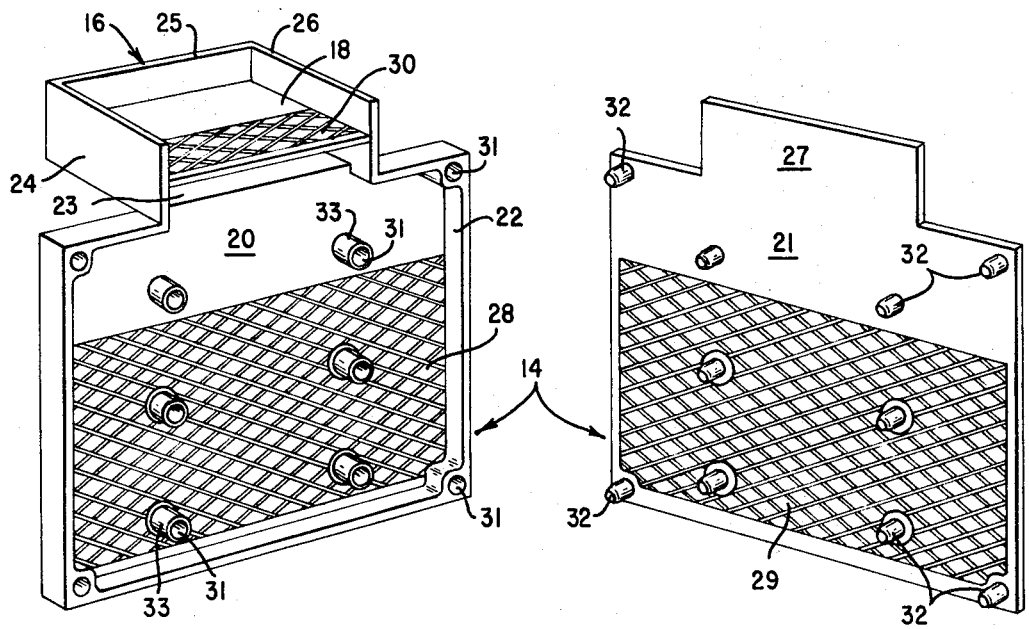
FIGS. 3 and 4 are views in perspective of the container of FIG. 2, showing how it may be fabricated as a two-piece molded construction which snaps together to provide the container.
Figure 5:
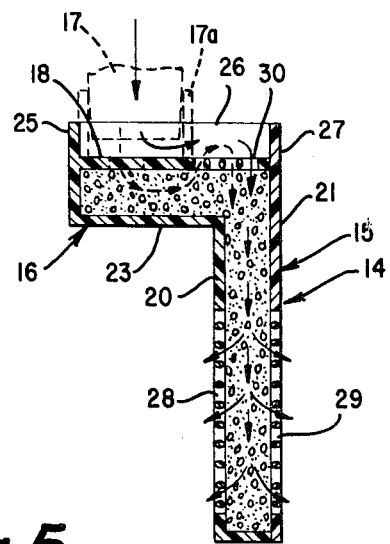
FIG. 5 is a cross-sectional view, taken along line 5—5 of FIG. 2, schematically indicating the manner in which water entering the acid gel container of this invention is caused to flow over the immobilized electrolyte within and thence into the interior of the battery cell.

Referring to FIGS. 3 and 4, the first or vertical portion 15 of the container is formed by a pair of spaced apart, parallel sidewalls 20 and 21, with the wall 20 having a peripheral perimeter 22 extending around it to form an enclosure when the side wall 21 is attached thereto. The second or horizontal portion 16 of the container includes a bottom plate 23, best seen in FIG. 5, which extends at right angles from the sidewall 20 and the upper surface 18 which is parallel to and spaced apart from the bottom wall 23 by surrounding sidewalls 24, 25 and 26. The bottom 23, sidewalls 24, 25 and 26, and upper surface 18 of the second section can be molded as a single unit with the sidewall 20, as illustrated in FIG. 3, while the sidewall 21 includes an upwardly-extending section 27 which, with the sidewalls 24, 25 and 26, forms a complete enclosure having a hollow, generally L-shaped interior, as seen in FIG. 5. The upper surfaces of the sidewalls 24, 25 and 26, and the section 27 extend above the top surface 18 of the second or horizontal section 16 to form a continuous peripheral border or cup around the filler tube 17, the function of which will be subsequently explained.

Figure 2:
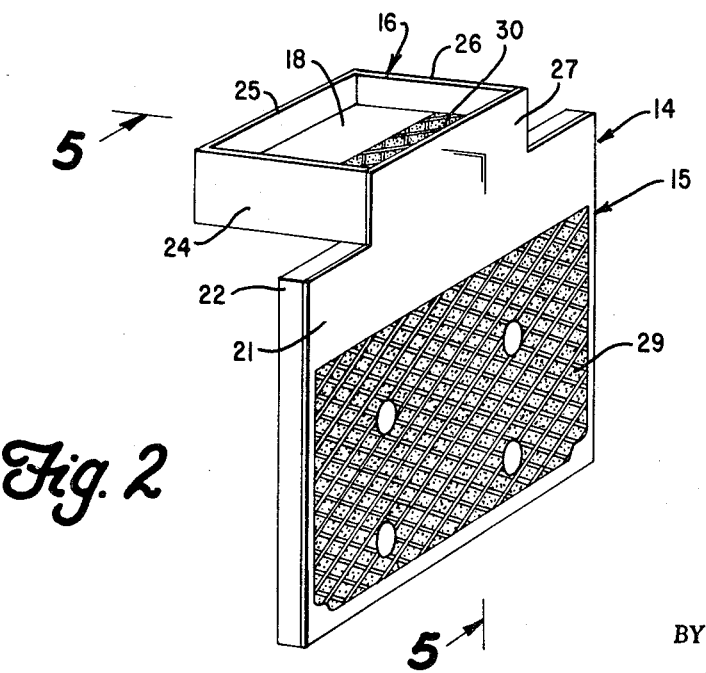
FIG. 2 is a view in perspective of the acid gel container of this invention.

As shown in this preferred embodiment, both of the walls 20 and 21 include, in their lower areas, a water-permeable section which may be a screen or mesh 28 and 29 molded into the sidewalls. In addition, a portion of the upper surface 18 of the second or horizontal section of the container includes a similar water-permeable section 30, as best seen in FIGS. 2 and 3. This water-permeable section 30 may be located anywhere in the upper surface 18 and can be substantially coextensive therewith.

The container of the preferred embodiment described above may be conveniently molded from a thermoplastic material, such as polypropylene or polyvinyl chloride, which is acid-resistant and has good structural stability. The liquid-permeable sections 28, 29 and 30 can be made from any type of screen which can be molded into the device and preferably can be of the same material, polypropylene or polyvinyl chloride, from which the remaining portions of the container are molded. The sidewalls 20 and 21 in the preferred embodiment contain a plurality of molded recesses 31 and correspondingly positioned pins 32, respectively, which snap together to attach the sidewalls 20 and 21 together. In the interior of the basket, the recesses 31 are formed in spacers 33 which extend from the inside of the sidewall 20 toward the attached position of the sidewall 21 so that the sidewalls, when snapped together, are prevented from inward or outward collapse by the recesses 31, pins 32 and spacers 33. Other molding compositions, screen compositions, and methods of mechanically attaching together the pieces will be apparent to those skilled in the art and will not be further described in detail.

The size of the openings or mesh size in the liquid-permeable sections 28, 29 and 30 is selected to allow the easy flow of liquid therethrough, but to retain the immobilizied electrolyte in its gel or granular form. The desired size will vary, depending upon the desired form of the immobilized acid and should generally be as large as possible to permit free flow of liquid therethrough.

The container for the immobilized acid described above is used and functions as follows. During the manufacture of the battery, the acid gel or granular material is placed within the enclosed areas of the container half shown in FIG. 3 and then the half section shown in FIG. 4 is attached thereto. In some cases, where sufficient gel can be loaded in the vertical section, it is unnecessary to load the interior of the horizontal section with acid gel so that this space will quickly fill with water to act as a reservoir which will be drained into the rest of the container through the gel. When using the immobilized acid in gel form, it is desirable to provide flow paths through the mass by extruding alternate crisscross layers or strips of irregular cross section within the container so that water will readily flow therethrough and will contact maximum gell surface. Alternatively, immobilized acid in the gel form may be frozen so that it can be crushed or ground, or otherwise divided into particles of the desired size. The frozen particles can be easily loaded into the acid containers, and, after thawing, the gel remains porous, so that the interstices between the grains provide flow paths.

The assembled basket is then placed within the battery in the manner shown in FIG. 1 and the battery is stored and shipped in this state. It may be desirable to provide a seal over each of the vents in the battery filler caps 19 to prevent moisture from entering the battery and partially activating the gelled electrolyte, which is hygroscopic. When the battery is ready for service, the cap from the filler opening 19 is removed, the moisture seal is punctured or removed, and the operator pours water through the filler tube opening 17 upon the top of the container. Referring to FIG. 5, the water flow, indicated by the unbroken arrows, is through the screen area 30, downwardly through the first section, and outwardly through the water-permeable areas 28 and 29. Because the uppermost portions of the water-permeable areas 28 and 29 are below a substantially large portion of the acid gel, all water leaving the container has been exposed to a substantial surface area and, thus, has released substantial amounts of the concentrated sulfuric acid prior to entering the battery cell. The residual silicon dioxide substantially remains within the container and will drop to the bottom portion of the container below the lowest edge of the screen areas 28 and 29 and will remain there. This residue will eventually adhere together in cake form and not affect the continued performance of the battery.

The cup or reservoir formed by the upper surfaces of the walls 24, 25 and 26, and the section 27, allows the installer to quickly pour in a relatively large amount of water without waiting for it to percolate through the container.

An alternate design for the container is shown in broken lines in FIG. 5 and which includes a filler pipe 17a molded on the top surface 18 which extends around the flange 17 with an aperture below the pipe 17a in the top surface 18. With this design, water flows from the pipe 17a directly into the container. If water enters at a rate faster than the rate of percolation through the container, it will overflow into the top cup or reservoir and thence drain downwardly, as indicated by the broken arrows in FIG. 5.

Finally, with the battery in its fully charged state, the immobilized electrolyte container of this invention remains in the battery, will not interfere with subsequent refilling of the battery to the proper acid level, and continues to retain the released powdered immobilizing agent therein.

Figure 6:
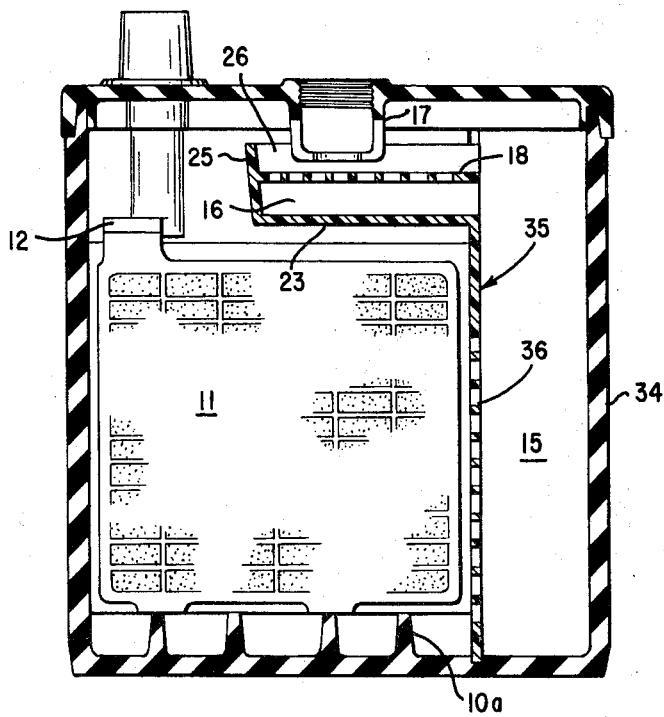
FIG. 6 is a cross-sectional view in elevation of a battery cell, showing another embodiment of the instant invention in which the acid gel container is formed as an integral part of the battery case.

FIG. 6 illustrates an alternate embodiment in which the container is formed as an integral part of the battery casing and is positioned adjacent the ends of the interleaved plate stack 11. This container is similar in shape and function to that previously described and includes a first vertical portion 15 formed by one side 34 of the battery case and a single vertical wall 35 with the water-permeable section 36 therein. The ends of this section 15 are provided by the walls separating the battery cells. The second horizontal portion 16 extends over the plate stack 11 and below the filler tube 17 as previously described. It should be understood that the integral-container of this embodiment can also be positioned parallel to the plate stack 11, similar to the embodiment of FIGS. 1–5, with its end walls of the vertical portion formed by the opposed sides of the battery casing, etc.

Figure 7:
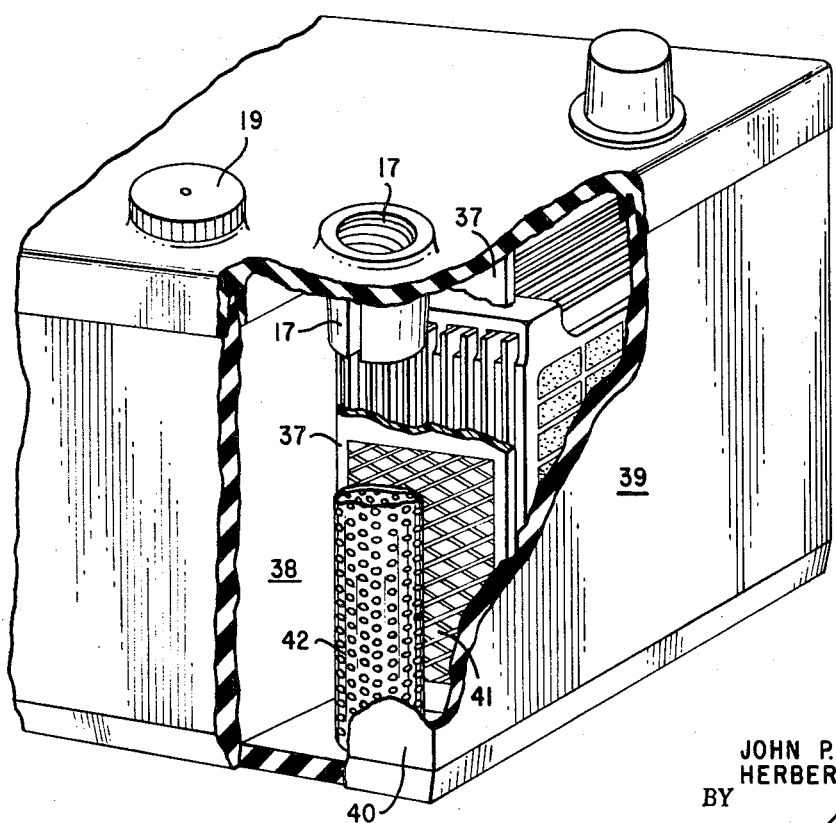
FIG. 7 is a view in perspective of a battery with parts broken away to show a second embodiment in which the acid gel container is formed as an integral part of the mattery casing.

FIG. 7 illustrates still another embodiment in which the acid gel container is formed by a single partition wall 37 extending adjacent the ends of the plate stack 11 and between opposite walls 38 and 39 of the battery cell with a portion 40 of the battery case forming the enclosure. The water-permeable section 41 is located in the lowermost portion of the wall 37 and the filler opening and tube 17 is positioned to one side of the battery to be over the container. In this embodiment, a perforate tube 42 may extend from the filler tube 17 downwardly to the bottom of the space to provide a water sump for rapid filling. With the acid gel packed within the container around the perforate tube 42, water therein will flow from all portions of the tube interior through the acid gel and finally through the screen area 41 to the plate stack 11.

In each of the embodiments of FIGS. 6 and 7, the vertical walls 35 or 37, respectively, can be molded as an integral part of the battery case or may be separate inserts which are securely held in position by interlocking slots, etc., or adhesive bonding, or both.

Various modifications of the above described preferred embodiments of this invention may be made by those skilled in the art without departing from the scope of the attached claims.

We claim:

1. In an electric storage battery having at least one enclosed cell with a filler opening positioned over a stack of interleaved battery plates, the improvement comprising a shaped container for containing a water-activable battery acid in semi-solid or granular form, said container comprising a first hollow rectangular portion having a width such that said first portion may be placed in vertical position within said enclosed cell between such interleaved plates and a cell sidewall, and a second hollow rectangular portion generally at right angles to said first portion such that it will overlie said interleaved plates when in position, said second portion having a liquid entrance on its upper surface generally beneath said battery filler opening whereby liquid entering said filler opening will enter said second portion and then said first portion, said first portion having at least one liquid-permeable wall section positioned in the lowermost area thereof whereby the interior of said lowermost section of said first portion is in liquid communication with said enclosed cell.

2. The device of claim 1 wherein said first hollow portion of said container has a length and height generally coextensive with said battery plates.

3. The device of claim 1 wherein each of the opposed sidewalls of said first hollow rectangular portion adjacent the battery plates and the sidewall of said cell, respectively, includes a liquid-permeable wall section.

4. The device of claim 1 wherein said liquid-permeable wall section extends over substantially the lowermost half of said first hollow rectangular portion of said container.

5. The device of claim 1 which further includes a filler tube extending upwardly from said upper surface of said second horizontal portion circumjacent a liquid entrance in said upper surface.

6. The device of claim 1 which further includes a continuous rim extending upwardly toward said battery filler opening and extending around the periphery of said second rectangular portion to form a liquid reservoir with the upper surface of said section.

7. The device of claim 1 which further includes at least one spacer element within said first hollow rectangular portion extending between opposed sides thereof to prevent inward or outward collapse of said hollow portion.

8. The device of claim 1 wherein the lowest edges of said liquid-permeable wall section are positioned above the lowest edges of the interior space within said first vertical section to provide a pocket for residue within said container.

9. In an electric storage battery having at least one enclosed cell with a filler opening positioned over a stack of interleaved battery plates, the improvement comprising a container for a water-activable battery acid in semi-solid or granular form, said container including a first hollow vertical portion extending between said plate stack and a vertical cell wall and a second hollow horizontal portion generally at right angles to said first portion such that it will overlie said plate stack when in position, said second portion having a liquid entrance on its upper surface generally below said battery filler opening whereby liquid entering said filler opening will flow through said second portion into said first portion, and said first portion having a liquid-permeable wall section whereby the interior thereof is in liquid communication with said enclosed cell.

10. The device of claim 9 wherein said first vertical portion comprises a vertical wall separating said container from said battery plate stack and at least one opposed sidewall of the battery case.

11. The device of claim 9 wherein said first hollow portion of said container has a length and height generally coextensive with said battery plates.

12. The device of claim 9 which further includes a continuous rim extending upwardly toward said battery filler opening and extending around the periphery of said second rectangular portion to form a liquid reservoir with the upper suface of said section.

13. In an electric storage battery having at least one enclosed cell with a stack of interleaved battery plates therein, the improvement comprising a container for a water-activable battery acid in semi-solid or granular form positioned within said cell adjacent said plate stack, said container being separated from said plates by a vertically extending wall having a liquid-permeable area therein, said container being positioned below the filler opening of said battery cover whereby liquid entering said opening will flow into said container and thence through said liquid permeable section into the plate area of said cell.

14. The device of claim 13 which further includes a perforate filler pipe extending vertically into said container from said filler opening substantially to the bottom of said battery.

References Cited

UNITED STATES PATENTS

| 778,912 | 1/1905 | Stockigt | 136—162 |
| 1,034,156 | 7/1912 | Sokal | 136—162 XR |
| 3,067,275 | 12/1962 | Solomon | 136—162 XR |
| 3,291,644 | 12/1966 | Gray et al. | 136—162 XR |

WINSTON A. DOUGLAS, Primary Examiner

D. L. WALTON, Assistant Examiner

U.S. Cl. X.R.

136—181